United States Patent
Crooks

(10) Patent No.: US 9,471,823 B1
(45) Date of Patent: Oct. 18, 2016

(54) MULTIPLE BARCODE PROCESSING APPARATUS, SYSTEMS, AND METHODS

(71) Applicant: John Crooks, Duluth, GA (US)

(72) Inventor: John Crooks, Duluth, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/698,229

(22) Filed: Apr. 28, 2015

(51) Int. Cl.
| | |
|---|---|
| *G06K 15/00* | (2006.01) |
| *G06K 7/10* | (2006.01) |
| *G02B 26/10* | (2006.01) |
| *G06K 7/14* | (2006.01) |

(52) U.S. Cl.
CPC ......... *G06K 7/1417* (2013.01); *G06K 7/10752* (2013.01); *G06K 7/10821* (2013.01); *G06K 7/1413* (2013.01); *G06K 7/1452* (2013.01)

(58) Field of Classification Search
USPC .......... 235/383, 462.01, 441, 462.14, 462.25
See application file for complete search history.

(56) References Cited

U.S. PATENT DOCUMENTS

| | | | | |
|---|---|---|---|---|
| 5,600,565 A * | 2/1997 | Wagner | .................. | G06Q 10/08 235/385 |
| 7,258,266 B1 * | 8/2007 | Bowe, Jr. | ............... | G06Q 10/00 235/375 |
| 8,424,761 B2 * | 4/2013 | Yanagi | .................. | G07G 1/0045 235/383 |
| 2008/0095441 A1 * | 4/2008 | Rosskamm | ............ | G06Q 10/20 382/183 |
| 2009/0032584 A1 * | 2/2009 | Yamada | ............... | G06Q 20/387 235/380 |
| 2009/0250516 A1 * | 10/2009 | Tsuchiya | ............. | G06Q 10/087 235/383 |
| 2010/0312634 A1 * | 12/2010 | Cervenka | ............. | G06Q 20/105 705/14.38 |
| 2010/0324978 A1 * | 12/2010 | Redmann | ............... | G06Q 30/02 705/14.1 |
| 2012/0228381 A1 * | 9/2012 | Drzymala | .......... | G06K 7/10554 235/440 |
| 2013/0087618 A1 * | 4/2013 | Zhu | ...................... | G07G 1/0081 235/462.01 |
| 2015/0220981 A1 * | 8/2015 | Ikumi | ................ | G06Q 30/0268 705/14.51 |

\* cited by examiner

*Primary Examiner* — Tuyen K Vo
(74) *Attorney, Agent, or Firm* — Schwegman, Lundberg & Woessner

(57) ABSTRACT

Various embodiments of apparatus, systems, and methods operate to identify, by a scanning device, whether barcode data includes one of a primary type or a secondary type. Additional activity includes reconfiguring the scanning device to receive secondary barcode data when the primary type comprises a non-standalone primary barcode, reporting a standalone secondary barcode of the secondary type to a transaction processing system, and buffering a non-standalone secondary barcode of the secondary type. Additional apparatus, systems, and methods are disclosed.

20 Claims, 4 Drawing Sheets

MULTIPLE BARCODE PROCESSING APPARATUS, SYSTEMS, AND METHODS

BACKGROUND INFORMATION

Many products have primary, and now secondary one-dimensional (1D) and two-dimensional (2D) barcodes that contain useful information. Reading multiple barcodes has become a common problem for handheld scanners. In some cases, the user attempts to manage the acquisition of information by aiming the handheld scanner at individual codes, one at a time.

However, some scanners, such as the all-imaging bi-optic scanners, are now able to read both 1D and 2D barcodes, including multiple barcodes, simultaneously. In this case, the user has no control over which barcodes are read by the scanner. For example, when the scanner beeps, the user does not know which barcode (primary or secondary) caused the beep. The problem becomes: how can this type of barcode scanner capture secondary barcodes when desired, while simultaneously suppressing the read of others—without compromising read performance?

SUMMARY

Various embodiments herein each include at least one of systems, devices, methods, and software that enable efficient processing of multiple barcode types. In one such embodiment, in the form of a method, includes identifying, by a scanning device, whether barcode data includes one of a primary type or a secondary type. Additional activities include reconfiguring the scanning device to receive secondary barcode data when the primary type comprises a non-standalone primary barcode; reporting a standalone secondary barcode of the secondary type to a transaction processing system; and buffering a non-standalone secondary barcode of the secondary type.

In another method embodiment, activities include identifying, by a scanning device, whether barcode data includes a barcode type as one of a primary type or a secondary type; accessing a database to locate at least one barcode processing rule associated with the barcode type; redefining the barcode type as a redefined secondary barcode when the barcode type is identified as a primary type, or redefining the barcode type as a redefined primary barcode when the barcode type is identified as a secondary type, according to the at least one barcode processing rule; and filtering new barcode, by the scanning device, to selectively receive the redefined primary barcode or the redefined secondary barcode.

DETAILED DESCRIPTION

Figure 1:
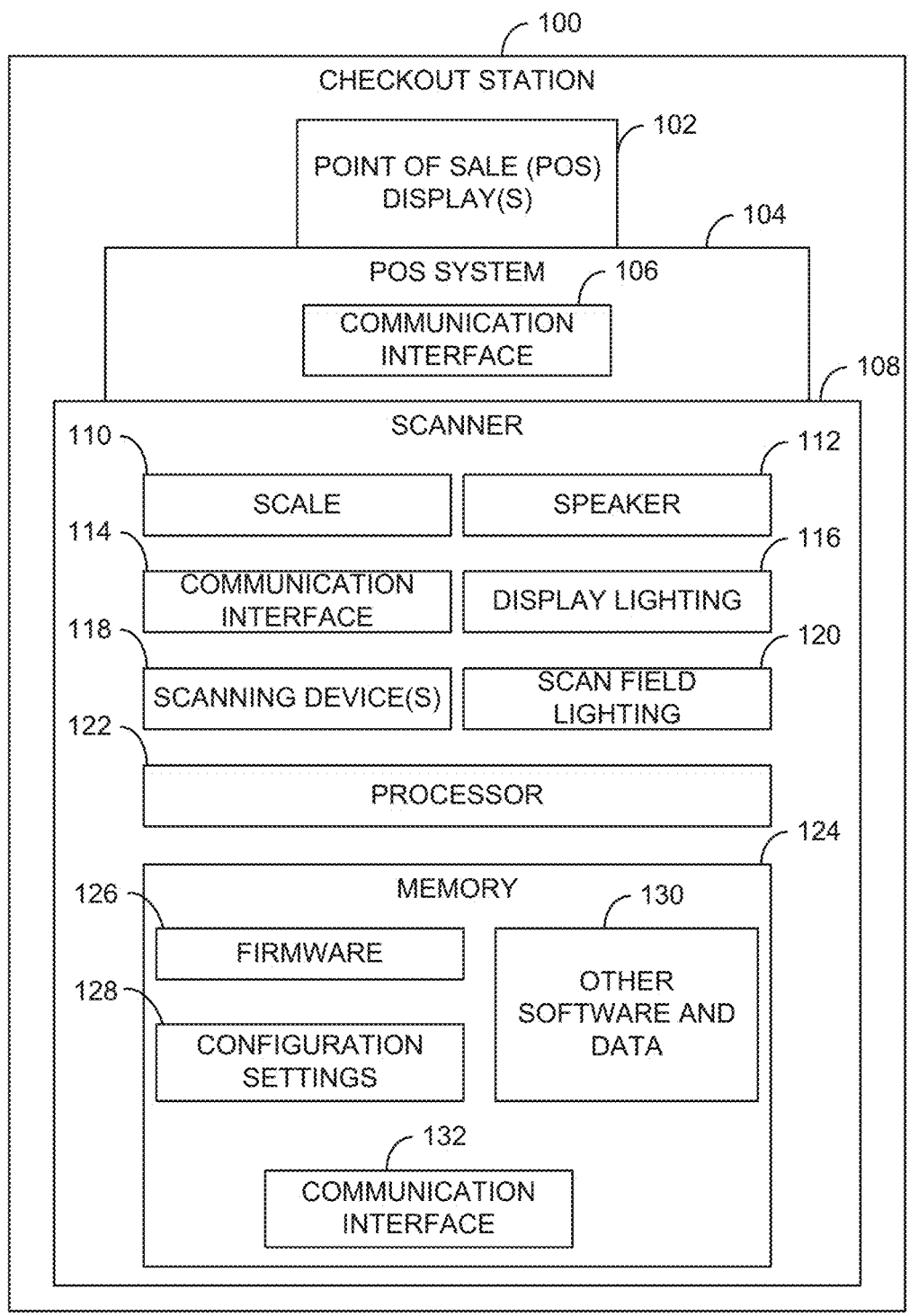
FIG. 1 is a diagram illustrating components of a checkout station having a scanner, according to an example embodiment.

Barcodes can be divided into two classes: primary and secondary. Primary barcodes are barcodes where maximum read performance is useful to enhance checkout speed. In most embodiments, a positive scan confirmation (e.g., beep sound) is used. Examples include the universal product code (UPC) labels that are available on most products, and the PDF417 barcode on drivers' licenses.

Secondary barcodes are less common. These are barcodes where maximum performance is not of primary concern, and for which reading may or may not be optional. Examples include Datamatrix barcodes for lot codes on medication, and C128 barcodes for discount stickers (and in some cases, C128 barcodes printed on drivers' licenses, in addition to the primary PDF417 barcode).

Primary and secondary barcodes can often be identified by symbology type. Other rules can be used to identify the barcode type as well, such as length, prefix, data content, shape (e.g., aspect ratio), among others. In most embodiments, identification rules for primary and secondary barcodes can be applied by the barcode scanner, by the associated point of sale (POS) software, or by a combination of these.

In most embodiments, a database containing rules is used as part of a system and method to effectively ignore undesirable barcodes, while enabling system reads of multiple desirable barcodes—together. In some embodiments, the system comprises a bi-optic scanner, such as NCR RealScan™ 7879 Bi-Optic Imager available from NCR Corporation of Duluth, Ga. (hereinafter the "7879 scanner"). This system can operation as a POS checkout device, with a POS terminal, printer, keyboard, display, magnetic stripe reader (MSR), and POS software.

In many embodiments, it is assumed that the POS involved as access to rules, such as customer-specific rules, that set forth which primary barcodes require secondary barcodes. For example, the store price look up (PLU) file may indicate the primary UPC code for a bottle of medication requires a secondary Datamatrix barcode to specify the expiration date. The PLU file may also indicate that the primary UPC code for a box of plastic bags does not require a secondary barcode. In another example, sales of alcoholic products may involve scanning a primary UPC for a bottle of whiskey, with a required secondary PDF417 barcode scan from a driver's license, to ascertain the age of the purchaser.

In many embodiments, primary barcodes will scan, automatically provide an audible "beep", and transmit to the acquired data to the POS immediately. Secondary barcodes will scan and transmit to the POS immediately, but do not automatically provide an audible indication (e.g., "beep").

As will be described in more detail later in this document, the POS software can be configured to apply customer-specific business rules to determine how data acquired from the secondary barcodes should be handled. Examples of rule sets that might be used in various embodiments include, but are not limited to:

RULE SET 1: After an initial scan, the POS software recognizes a primary barcode that requires the user to capture a secondary barcode. The POS software temporarily re-configures the scanner to disable all primary barcodes, and enable only the desired secondary barcode. The POS software then prompts the user to re-scan the item to capture the secondary barcode. When the POS software receives information from the secondary barcode, an audible indication is made to acknowledge acquisition, for example by sending a command to the scanner to make it beep.

RULE SET 2: After an initial scan, the POS recognizes a primary barcode that does not require a secondary barcode. The POS software does nothing with respect to additional scanning, and allows the transaction to continue with scanning additional products, or executing a tender operation.

RULE SET 3: After an initial scan, the POS recognizes a secondary barcode. The POS operates to buffer the secondary barcode. If the POS acquires additional information, and recognizes a primary barcode within a timeout period (e.g., within one second) that requires the secondary barcode, the POS operates to store the primary and secondary barcode together and allows the transaction to continue. If the timeout period expires, or if the POS recognizes a primary barcode that does not require a secondary barcode, the POS flushes the secondary barcode from the buffer and allows the transaction to continue. In some embodiments, the secondary barcode is checked against the PLU database to verify that it is present in the database.

RULE SET 4: After an initial scan, the POS software recognizes a secondary barcode that, after the application of another rule set, stands alone and should be acknowledged with an audible indication (e.g., "beep"). For example, the scanner might be configured to classify all Datamatrix barcodes as secondary, and send them to the POS from the scanner without any audible signal. This prevents unexpected beeps when scanning medication with a Datamatrix lot code. However, the sales location may encounter loyalty cards that also use Datamatrix symbology. The POS might then evaluate all secondary Datamatrix barcodes it receives from the scanner to identify whether they are loyalty barcodes (e.g., according to length or data content). If they are associated with the sales location's loyalty program, the POS might operate to send a command to the scanner to make an audible indication (e.g., "beep") and acknowledge acquisition of the barcode associated with the loyalty program.

RULE SET 5: After an initial scan, the POS software recognizes a secondary barcode that, after the application of another rule set, is to be combined with the nearest primary barcode. For example, the secondary barcode might represent a discount sticker that the POS software identifies by evaluating the barcode shape or data content. The POS may then assign the secondary barcode to a primary barcode that was previously, or subsequently acquired—depending on which is physically closer to the secondary barcode, and/or which is most appropriate to receive a discount code.

In some embodiments, the definition of primary and secondary barcodes might change dynamically, as a sales transaction progresses from initial scans through to a tendering operation. For example, while items are being scanned, all Datamatrix barcodes might be classified as secondary barcodes that do not elicit an audible indication (e.g., "beep") from the scanner. However, during the tendering operation, the POS software might redefine Datamatrix barcodes to be primary barcodes that elicit beeps, to operate in accordance with the store's loyalty program that uses Datamatrix symbology.

In some embodiments, the POS software applies business-specific rules. In other embodiments, the barcode scanner, or a combination of barcode scanner and POS software, applies the rules. For example, the 7879 scanner with an Ethernet connection can query the PLU database server directly to identify those primary barcodes that require a secondary barcode, and those that do not. The 7879 scanner can also download and maintain a local copy of all or part of the store PLU database file to make local decisions. When the 7879 scanner identifies a primary barcode that needs a secondary barcode, the 7879 scanner can prompt the user to scan the secondary barcode by an audible indicator (e.g., distinctive beep pattern), by voice, or by sending a command to the POS software to display prompts to the user on a video display.

While data of secondary barcodes may be useful and even important for some purposes, when data encoded in secondary barcodes is not needed or desired by a POS system, or other system that may process barcode data, reading and processing data of secondary barcodes slows operation of the scanner and terminal under use. Thus, the various embodiments herein operate to address some of these issues presented by products that secondary barcodes affixed thereto or otherwise printed thereon.

FIG. 1 is a diagram illustrating components of a checkout station 100 having a scanner 108, according to an example embodiment. It is to be noted that the checkout station 100 is shown schematically in greatly simplified form, with example components relevant to understanding the various embodiments described herein. This simplification is also in effect for components of the checkout station 100. Thus, the checkout station 100 may include more or fewer components in some embodiments.

Moreover, the various components included in the FIG. 1 as illustrated and arranged are provided for illustration purposes only. Other arrangements with more or fewer components are possible without departing from the description of various embodiments herein, in particular with regard to automatic and remote scanner configuration. Thus, although the checkout station 100 is illustrated to include a scanner 108, the scanner 108 may be a standalone element or an element of other systems, devices, and terminals in other embodiments. Examples of other terminal-types that may include a scanner 108 are self-service terminals (SSTs), clerk operated and self-service library checkout stations, time-keeping terminals, Pay-at-the-Pump terminals attached to a fuel pump at a fueling station, and the like.

The methods of some embodiments are programmed as executable instructions in memory and/or non-transitory computer-readable storage media and executed on one or more processors and other such data processing devices associated with the components and devices herein. Thus, in some embodiments, a non-transitory machine-readable storage device comprises instructions stored thereon, which, when performed by a machine, cause the machine to become a customized, particular machine that performs operations comprising one or more features similar to or identical to those described with respect to the methods and techniques described herein. A machine-readable storage device, herein, is a physical device that stores information (e.g., instructions, data), which when stored, alters the physical structure of the device. Examples of machine-readable storage devices can include, but are not limited to, memory in the form of read only memory (ROM), random access memory (RAM), a magnetic disk storage device, an optical storage device, a flash memory, and other electronic, magnetic, or optical memory devices, including combinations thereof.

The physical structure of stored instructions in the memory 124 may be operated on by one or more processors such as, for example, the processor 122. Operating on these physical structures can cause the machine to become a specialized machine that performs operations according to methods described herein.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes one or more scanners 108.

The scanner 108 may be referred to as a barcode scanner as that is the task most commonly associated with such devices. An example of such a barcode scanner is the 7879 scanner. During operation of the checkout station 100, items are placed within a scan field of the scanner 108. One or more scanning devices 118 of the scanner 108, such as one or more of a camera and a laser scanner then scan a barcode and information read therefrom is communicated to the POS system 104. The POS system 104 then uses that data to identify the item placed within the scan field of the scanner 108 and performs an additional function. The additional function may include a price lookup and addition of the item to a list of items to be purchased, which may be presented on the one or more POS displays 102.

The scanner 108 may include one or more scan fields, such as two scan fields of bi-optic scanners that are in use in grocery and discount retail outlets, and well known to those of ordinary skill in the art. In addition to the scanning devices 118, the scanner 108 may include various other components. The various other components may include an integrated scale 110 such as may be used in a grocery outlet to weigh produce and one or both of a speaker 112 and display lighting 116 to output audio and visual signals such as signals indicating successful and/or unsuccessful scans. The scanner 108 may also include scan field lighting 120 that may be turned on and off and adjusted based on a detected presence of an item to be scanned.

During operation, the scanner 108 is functions according to instructions executed on a processor 122. The processor 122 may comprise an application integrated circuit (ASIC), a digital signal processor, a microprocessor, or another type of processor. The instructions may comprise firmware 126 or software 130 stored in one or more memories 124. The one or more memories 124 may comprise volatile and/or non-volatile memories, write-protected memories, write-once memories, RAM, ROM, and other memory and data storage types and devices.

The instructions stored in firmware 126 and/or as software 130 in memory 124 are executed according configuration settings stored in the memory 124. The configuration settings 128 configure operation of the scanner 108, and various components, both hardware and software, therein. For example, the configuration settings 108 may operate to configure the volume of the speaker 112, display lighting 116 operation, brightness of the scan field lighting 120, selection of a decoding algorithm for the scanning device(s) 118, and the selection of one or more communication protocols used to communicate data from the scanner 108 to the POS system 104, via a wired or wireless communication interface 106 of the POS system 104 to a physical communication interface device 114 or virtualized communication interface 132 of the scanner 108. For example, in some embodiments, the communication interface 106 of the POS system 104 is accessible from the scanner 108 as a virtualized communication interface 132 maintained in the memory 124 by a process that executes on the processor 122. Each of the communication interfaces 106, 114 may comprise wired or wireless communication interface devices, such as a wired Ethernet device, a wireless Ethernet device (e.g., a device capable of communicating according to one or more of the 802.11 standards), a Bluetooth® communication device, a mesh network device or other peer-to-peer type networking device, a mobile network data communication device, and the like.

In some embodiments, a product placed within the scan field of the scanner 108 may include a primary barcode, such as a UPC, and one or more secondary barcodes that may be present on the product for various purposes. Such purposes may include an encoded lot number, publication or freshness date, manufacture and/or expiration date, etc. In some instances, the secondary barcode data may be needed to process the sale of, or track the location of the product being sold. In other instances, the secondary barcode is not needed.

Thus, in a conventional system, when a secondary barcode is read, a scanner might immediately communicate the barcode data from a scanned secondary barcode to the POS system 104. When this barcode data is not needed or cannot be processed by the POS system 104, operation of the POS system 104 slows down to make time for the POS system 104 to return a signal to the scanner 108 indicating a bad barcode read condition. The product must then be rescanned to obtain the proper barcode, such as the UPC. This may result in another scan of the secondary barcode, which further slows operation. Various embodiments herein address this situation by maintaining a database, which may be local to the scanner 108, perhaps stored in configuration settings 128 present in a memory 124 of the scanner 108. This local database, in some embodiments, is a self-learned database that is built or augmented over time as bad barcode reads are communicated back to the scanner 108 by the POS system 104. In some embodiments, the scanner database may also or alternatively be obtained or augmented with data from a remote barcode database maintained on a network and accessed by the scanner 108 via a communication interface 114 of the scanner 108. As mentioned elsewhere herein, the communication interface 114 may be a network interface device, such as a wired or wireless Ethernet device. In some embodiments, data from the local database may also be communicated via the communication interface 114 to a network service that synchronizes barcode data in the barcode database maintained on the network.

In some embodiments, the software 130 stored in memory 124 includes instructions executable on the processor 122 to automatically set the configuration settings 128, such as upon scanner 108 installation, completion of scanner 108 maintenance, or other times with regard to the scanner 108. In some embodiments, the software 130 stored in the memory 124 includes instructions executable by the processor 122 to suppress processing of data read from secondary barcodes in view of a local database of secondary barcode data also stored in the memory 124, such as in or with the configuration settings 128.

In some embodiments, a group of scanners 108 deployed on a network may share a database of barcode data accessible via a network by communication interfaces 114 of the respective scanners 108. In other embodiments, the various scanners 108 may synchronize their local barcode databases among each other in a Peer-to-Peer (P2P) manner or via a network service or shared database accessible via the network.

In some embodiments, a database of barcode data may simply include barcode data that is to be ignored when encountered by the scanner 108. For example, the scanning device 118 may operate to scan and decode a barcode, and firmware 126 or other software 130 may execute on the processor 122 to query a local database of barcode data stored in the configuration settings 128 to see if the scanned barcode data is present therein. In such embodiments, when the barcode data is present in the local database, the barcode data is simply ignored and the scanning device 118 is returned to a barcode searching and scanning mode. In other embodiments, barcode data stored in the local database may include records of barcode data including barcode data of one barcode and a rule or an association with a rule that includes instructions or is associated with instructions that are to be performed upon the scanner 108 encountering the barcode data. The records may include instructions to: ignore the barcode data, to submit the barcode data to another system such as a POS system, to request additional information from a customer such as a date of birth or driver's license which may also be scanned, trigger a process to load a value to pre-paid gift or debit card, and the like. Thus, a local database, or another database as described herein, that stores barcode data may be take different forms and store different data (e.g., rules and records of instructions) in various embodiments.

Figure 2:
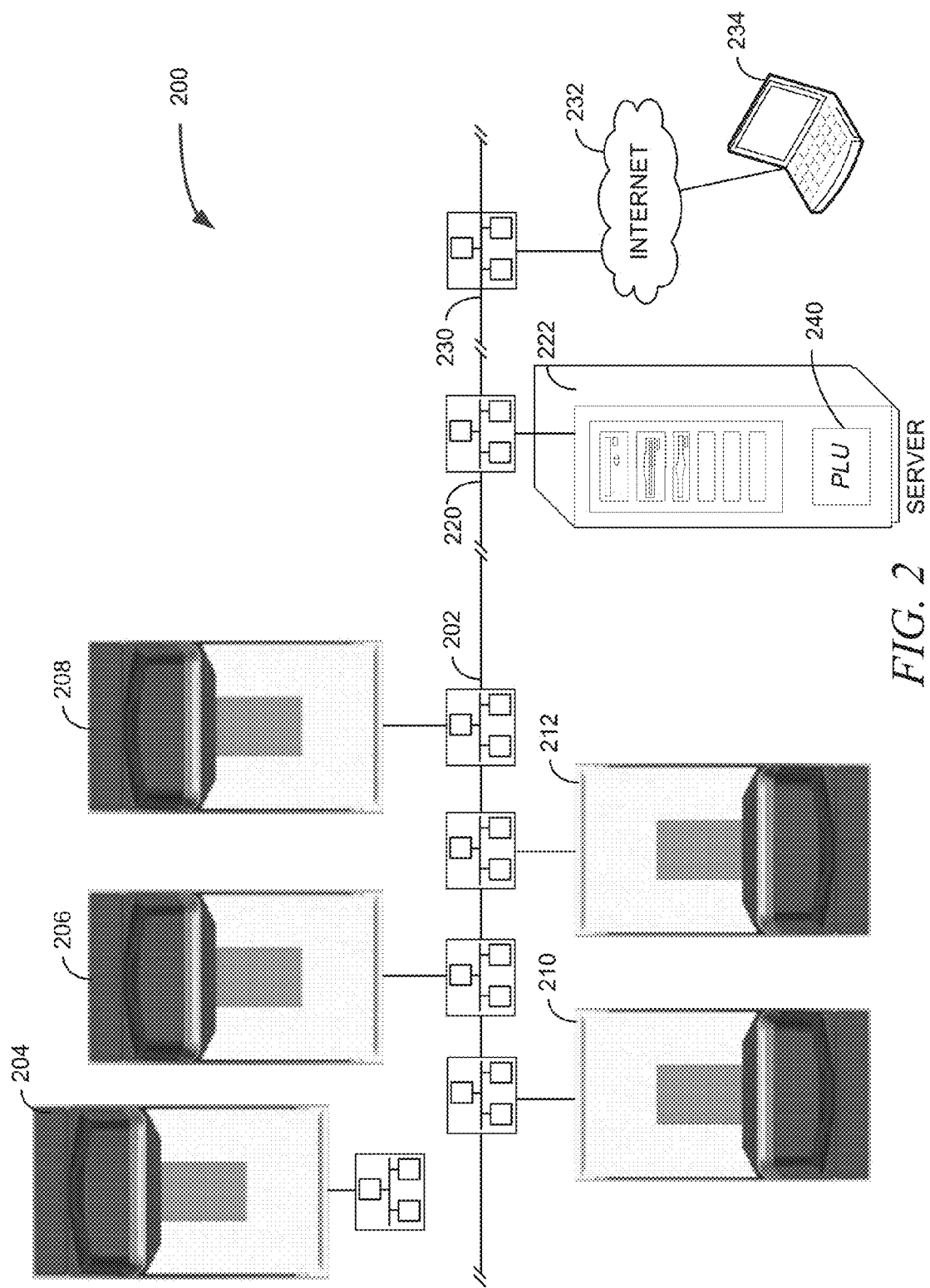
FIG. 2 is block diagram of networked system components, according an example embodiment.

FIG. 2 is block diagram of networked system 200 components, according an example embodiment. The networked system 200 is a view of a networked system including scanners 206, 208, 210, 212 connected to a network segment 202. The network segment 202 may be a stand-alone network, such as a network within a retail outlet. The network segment 202 may also be part of a larger network that includes additional network segments 220, 230. For example, the network segment 202 may be a store-based network that is also coupled a corporate network segment 220. The corporate network segment 220 may further be coupled to an internet 232 network segment 230.

The network segment 202 includes the plurality of scanners 206, 208, 210, 212 connected thereto. The system 200 also includes a scanner 204 that has not yet been connected to the network segment 202. In some embodiments, once the scanner 204 is connected to the network segment 202, a configuration process will execute within the scanner to automatically set its configuration. This may include discovering its configuration through communication with one or more of the other scanners 206, 208, 210, 212, requesting configuration setting data from a server 222 that may be accessible via the network segment 202, the corporate segment network 220, or the Internet 232 network segment 230. These configuration settings may include data to be stored on the scanner 204 as a local database of barcode data, which may include barcode data of secondary barcodes to suppress. Further, the configuration settings may also be pushed to, or otherwise remotely sent to the scanner 204, or to other scanners 206, 208, 210, 212 from the server or from a computing device 234 that may be connected to the Internet 234, the corporate network segment 220, or the network segment 202 via an interface of the scanners 204, 206, 208, 210, 212 as discussed above. In some embodiments, local databases of barcode data stored in the memories of the scanners 204, 206, 208, 210, 212 maybe synchronized via one or more of the network segments 202, 220, 230 via P2P processes that execute on the scanners 204, 206, 208, 210, 212, via a process on the server 222, or otherwise. In some embodiments, a PLU database 240 may be located on a server 222.

The scanners 204, 206, 208, 210, 212 may be similar to or identical to the scanner 108 shown in FIG. 1. Thus, although not illustrated, the scanners 206, 208, 210, 212 may be coupled to terminals, such a POS terminals, self-service kiosks, and the other types of terminals discussed elsewhere herein (e.g., POS system 104 and checkout station 100 of FIG. 1).

Thus, as will become apparent to those of ordinary skill in the art, after reviewing this document and FIG. 2, some embodiments can implement the functions described herein as part of the activity of two or more specific interconnected hardware modules or devices with related control and data signals. These control and data signals may be communicated between and through the modules, or as portions of an application-specific integrated circuit. Thus, the example process flow that follows is applicable to software, firmware, and hardware implementations.

Figure 3:
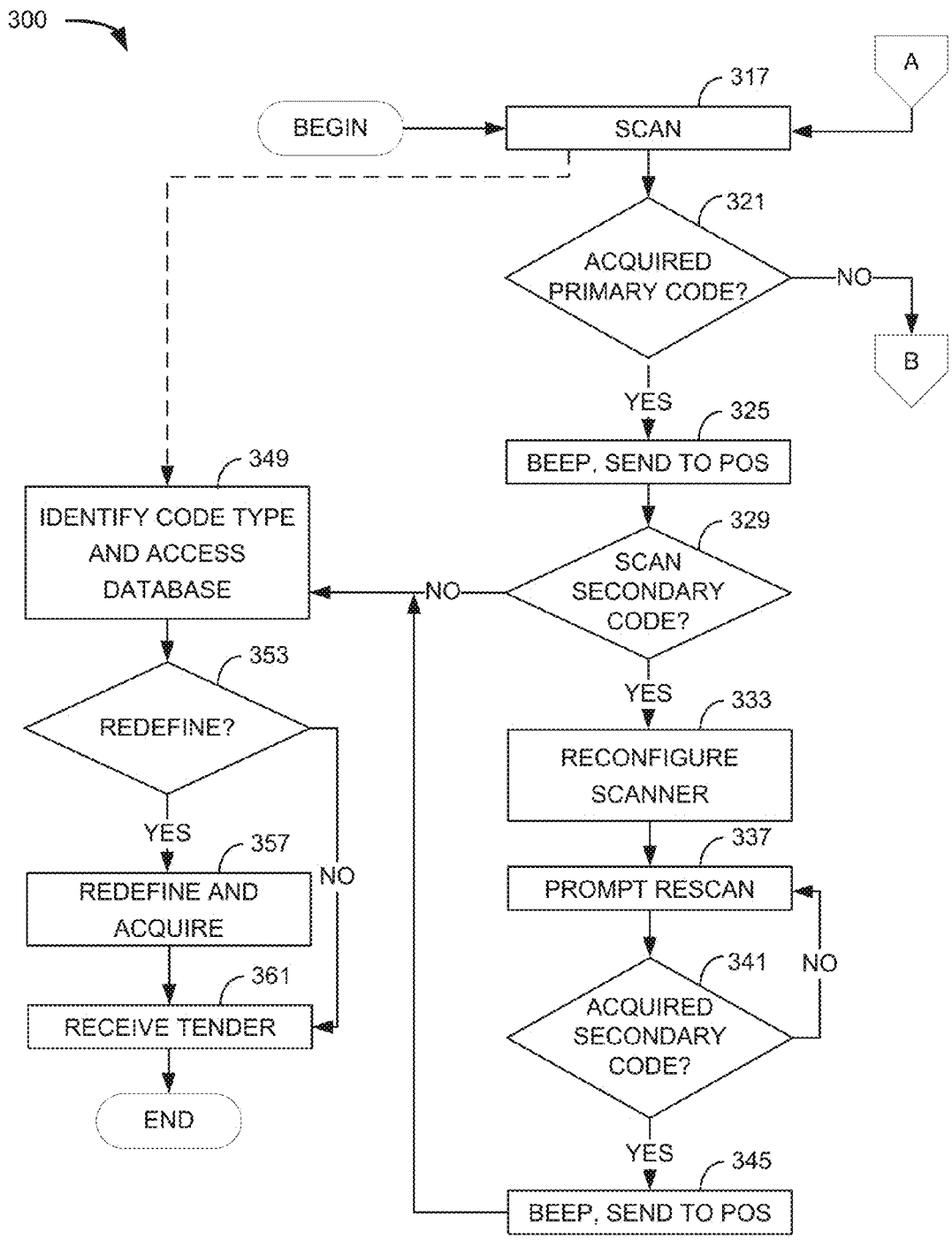
FIGS. 3-4 illustrate a flow diagram of a method, according to an example embodiment.
Figure 4:
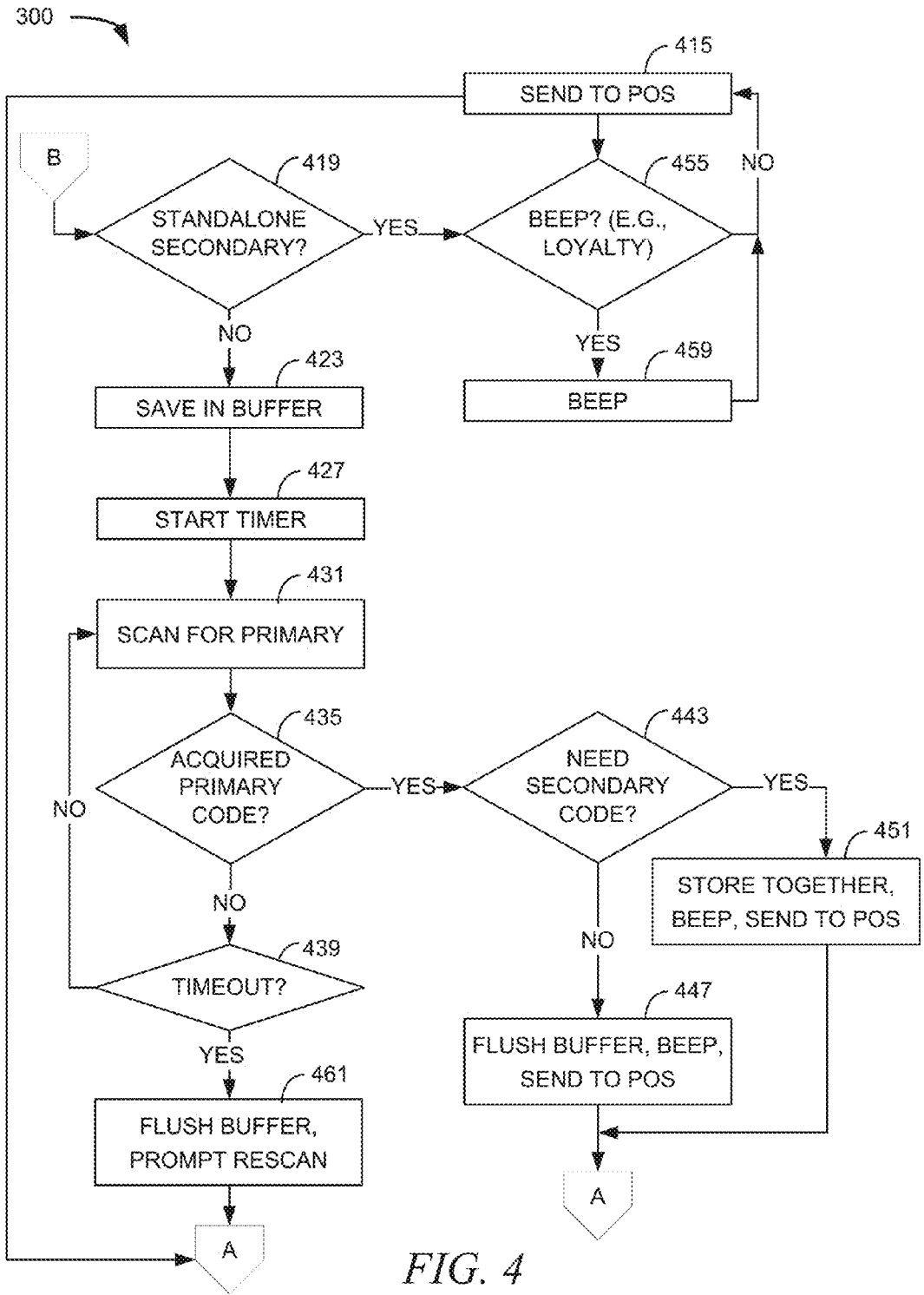

FIGS. 3-4 illustrate a flow diagram of a method 300, according to an example embodiment. The method 300 is an example of a method that may be performed on a scanner, such as the scanner 108 of FIG. 1, as well as on any of the scanners 204, 206, 208, 210, 212 of FIG. 2.

Referring now to FIGS. 1-3, it can be seen that the method 300 may begin at block 317 with receiving barcode data read by a barcode scanning device, such as one of the one or more scanning devices 118 of the scanner 108 of FIG. 1. The barcode data may be received by a firmware 126 or software 130 process taking place within the scanner 108.

The method 300 continues on to block 321 to include identifying, by the scanning device, whether the barcode data includes one of a primary type or a secondary type. When the acquired barcode data includes a primary type, as determined at block 321, the method 300 may continue on to block 325 to include reporting the primary type to the transaction processing system when the primary type comprises a standalone primary barcode.

If a secondary barcode should be scanned, as determined at block 329, such as when the primary type comprises a non-standalone primary barcode, the method 300 may continue on to block 333 to include reconfiguring the scanning device to receive secondary barcode data when the primary type comprises a non-standalone primary barcode. The activity of reconfiguring at block 333 may include reconfiguring the scanning device to ignore the primary type in the secondary barcode data.

The method 300 may then continue on to block 337 to include prompting for acquisition of the secondary barcode data including an associated secondary type after reconfiguring the scanning device.

When the secondary barcode is acquired at block 341, the method 300 may continue on to block 345 to acknowledge acquisition of the secondary barcode (e.g., with an audible beep), and then send the secondary barcode to the POS.

Returning to block 321, when the acquired barcode data includes a secondary type (i.e., does not include a primary type, as determined at block 321), the method 300 may continue on to block 419 to include accessing a set of barcode processing rules to determine that the secondary type comprises the standalone secondary barcode at block 419, and then going on to block 455 to determine whether an audible signal should be emitted to acknowledge presence of a selected type of the standalone secondary barcode. If not, then processing of the secondary barcode may include reporting the standalone secondary barcode of the secondary type to a transaction processing system, such as a POS, at block 415, with no audible indication. Otherwise, an audible signal (e.g., a "beep" signal) may be emitted at block 459, and thereafter, the secondary barcode is reported to the transaction processing system at block 415.

In some embodiments, when the acquired barcode data includes a secondary type that is not a standalone secondary barcode, then the method 300 may continue on to block 423 with buffering a non-standalone secondary barcode of the secondary type. The activity at block 419 may thus comprise accessing a set of barcode processing rules to determine that the secondary type comprises the non-standalone secondary barcode, and assigning the non-standalone secondary barcode to an associated primary barcode.

The method 300 may then continue on to block 427 to include starting a timer to limit a time period for identifying the associated primary type from new barcode data acquired after the buffering. The method 300 may then continue on to block 431 to include acquiring new barcode data that identifies the primary type during the time period.

The method 300 may then continue on to block 435 to determine that barcode data including a primary type has been acquired. This may be determined by, for example, determining the identity of the associated primary barcode based on physical proximity to the non-standalone secondary bar code. In some embodiments, the activity at block 435 include determining the identity of the associated primary barcode based on at least one barcode processing rule applied to barcodes scanned prior to and after acquisition of the bar code data acquired at block 435.

If the appropriate barcode data including a primary type has been acquired at block 435 (within the timeout limit set by the timer started at block 423), then the method 300 may continue on to block 443 to include determining that the primary type is associated with the secondary type. If there is an association, then the method 300 may continue on to block 451 to include storing the primary and secondary types together, emitting an audible signal, and then reporting the primary type and the secondary type to the transaction processing system (e.g., POS).

In some embodiments, the method 300 includes acquiring the new barcode data that identifies the primary type during the time period at block 435, as well as determining the primary type comprises a standalone primary barcode (i.e., no secondary code is needed) at block 443, and then flushing the buffer before or while emitting an audible indication (e.g., "beep") and reporting only the primary type to the transaction processing system (e.g., POS) at block 447.

In some embodiments, the method 300 comprises failing to acquire the new barcode data that identifies the primary type during the time period at blocks 435 and 439, and then flushing the buffer and prompting acquisition of alternative barcode data at block 461.

In some embodiments, barcode types may be redefined dynamically, as part of the scanning or tender processes. Thus, returning to the activity of block 329, in some embodiments, the acquisition of a primary code type (or a secondary code type) may lead to redefinition of code types for subsequent scanning activity.

For example, after scanning to obtain barcode data at block 317, the method 300 may continue on to block 349 to include identifying, by a scanning device, whether barcode data includes a barcode type as one of a primary type or a secondary type, and then accessing a database to locate at least one barcode processing rule associated with the identified barcode type. In some embodiments, the database is located in the scanning device. In some embodiments, the database is located in a transaction processing system (e.g., POS) communicatively coupled to the scanning device (e.g., see FIGS. 1 and 2).

The method 300 may continue on to block 357 to comprise redefining the barcode type as a redefined secondary barcode when the barcode type is identified as a primary type, or redefining the barcode type as a redefined primary barcode when the barcode type is identified as a secondary type, according to the at least one barcode processing rule. For example, the activity of redefinition at block 357 may include redefining the bar code type to be a redefined primary bar code of a selected type, to enable selective reception of loyalty program data.

The activity at block 357 may further comprise filtering new barcode, by the scanning device, to selectively receive the redefined primary barcode or the redefined secondary barcode. The activity at block 357 may also comprise emitting an audible signal to prompt acquisition of the at least one redefined primary barcode or the redefined secondary barcode.

In some embodiments, the activity of accessing the database at block 349 occurs as part of a tendering operation, so that the method 300 comprises receiving a tender of currency (e.g., cash or credit, or some other token of value) at block 361.

Another embodiment of the invention takes the form of a scanner, such as the scanner 108 of FIG. 1. The scanner in such embodiments includes a communication interface device 114, at least one barcode reading device (e.g., scanning device 118), at least one data processing device such as a processor 122, and at least one memory device 124. The at least one memory device 124 stores, among other things, a local database of barcode data and instructions (e.g., perhaps part of the other software and data 130) executable by the at least one data processing device. The instructions in such embodiments are executable by the at least one data processing device to perform data processing activities. These data processing activities may include any and every action described with respect to the method of FIG. 3.

Thus, in some embodiments, a system comprises at least one barcode scanning device (e.g., scanning device 118), at least one data processing device (e.g., the processor 122), and at least one memory device 124 storing a local database (e.g., as part of the other software and data 130) of barcode data and instructions executable by the at least one data processing device. The instructions are executable by the at least one data processing device to perform data processing activities comprising: identifying, by a scanning device, whether barcode data includes one of a primary type or a secondary type; reconfiguring the scanning device to receive secondary barcode data when the primary type comprises a non-standalone primary barcode; reporting a standalone secondary barcode of the secondary type to a transaction processing system; and buffering a non-standalone secondary barcode of the secondary type.

In some embodiments of the system, the scanning device forms a part of the transaction processing system that comprises a Self-Service Terminal (SST). In some embodiments, the SST comprises a self-checkout Point-Of-Sale (POS) system. Many other embodiments may be realized, but are not explicitly described here in the interest of simplicity and brevity.

Thus, the accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
identifying, by a scanning device, whether barcode data includes one of a primary type or a secondary type based on one or more rules that designate a barcode captured by the scanning device as either a primary or secondary barcode;
reconfiguring the scanning device to receive secondary barcode data when the primary type comprises a non-standalone primary barcode;
reporting a standalone secondary barcode of the secondary type to a transaction processing system; and
buffering a non-standalone secondary barcode of the secondary type.

2. The method of claim 1, further comprising:
reporting the primary type to the transaction processing system when the primary type comprises a standalone primary barcode.

3. The method of claim 1, further comprising:
starting a timer to limit a time period for identifying a primary type from new barcode data acquired after the buffering.

4. The method of claim 3, further comprising:
acquiring the new barcode data that identifies the primary type during the time period;
determining the primary type is associated with the secondary type; and
reporting the primary type and the secondary type to the transaction processing system.

5. The method of claim 3, further comprising:
acquiring the new barcode data that identifies the primary type during the time period;
determining the primary type comprises a standalone primary barcode; and
flushing the buffer and reporting only the primary type to the transaction processing system.

6. The method of claim 3, further comprising:
failing to acquire the new barcode data that identifies the primary type during the time period;
flushing the buffer; and
prompting acquisition of alternative barcode data.

7. The method of claim 1, further comprising:
prompting for acquisition of the secondary barcode data including an associated secondary type after reconfiguring the scanning device.

8. The method of claim 1, wherein the reconfiguring includes reconfiguring the scanning device to ignore the primary type in the secondary barcode data.

9. The method of claim 1, further comprising:
accessing a set of barcode processing rules to determine that the secondary type comprises the standalone secondary barcode; and
emitting an audible signal to acknowledge presence of a selected type of the standalone secondary barcode.

10. The method of claim 1, further comprising:
accessing a set of barcode processing rules to determine that the secondary type comprises the non-standalone secondary barcode; and
assigning the non-standalone secondary bar code to an associated primary barcode.

11. The method of claim 10, further comprising:
determining an identity of the associated primary barcode based on physical proximity to non-standalone secondary bar code.

12. The method of claim 10, further comprising:
determining an identity of the associated primary barcode based on at least one barcode processing rule applied to barcodes scanned prior to and after acquisition of the bar code data.

13. A method comprising:
identifying, by a scanning device, whether barcode data includes a barcode type as one of a primary type or a secondary type based on one or more rules that designate a barcode captured by the scanning device as either a primary or secondary barcode;
accessing a database to locate, at least one barcode processing rule associated with the barcode type;
redefining the barcode type as a redefined secondary barcode when the barcode type is identified as a primary type, or redefining the barcode type as a redefined primary barcode when the barcode type is identified as a secondary type, according to the at least one barcode processing rule; and
filtering new barcode, by the scanning device, to selectively receive the redefined primary barcode or the redefined secondary barcode.

14. The method of claim 13, further comprising:
emitting an audible signal to prompt acquisition of the at least one redefined primary barcode or the redefined secondary barcode.

15. The method of claim 13, wherein the accessing occurs as part of a tendering operation.

16. The method of claim 13, wherein the database is located in the scanning device or in a transaction processing system communicatively coupled to the scanning device.

17. The method of claim 13, wherein the redefining comprises redefining the bar code type to be a redefined primary bar code of a selected type, to enable selective reception of loyalty program data.

18. A system, comprising:
at least one barcode scanning device;
at least one data processing device; and
at least one memory device storing a local database of barcode data and instructions executable by the at least one data processing device, the instructions executable by the at least one data processing device to perform data processing activities, the data processing activities comprising:
identifying, by a scanning device, whether barcode data includes one of a primary type or a secondary type based on one or more rules that designate a barcode captured by the scanning device as either a primary or secondary barcode;

reconfiguring the scanning device to receive secondary barcode data when the primary type comprises a non-standalone primary barcode;

reporting a standalone secondary barcode of the secondary type to a transaction processing system; and buffering a non-standalone secondary barcode of the secondary type.

19. The system of claim 18, wherein the scanning device forms a part of the transaction processing system that comprises a Self-Service Terminal (SST).

20. The system of claim 19, wherein the SST comprises a self-checkout Point-Of-Sale (POS) system.

* * * * *